Feb. 2, 1971  R. S. MOORE  3,560,259
METHOD OF RECLAIMING TANTALUM FROM TANTALUM SUBSTRATES
HAVING OXIDES OF TANTALUM THEREON
Filed Dec. 4, 1969

INVENTOR
R.S. MOORE
BY
ATTORNEY

United States Patent Office 3,560,259
Patented Feb. 2, 1971

3,560,259
METHOD OF RECLAIMING TANTALUM FROM TANTALUM SUBSTRATES HAVING OXIDES OF TANTALUM THEREON
Robert S. Moore, Pittsford, N.Y., assignor to Bell Telephone Laboratories, Incorporated, Murray Hill, N.J., a corporation of New York
Filed Dec. 4, 1969, Ser. No. 882,136
Int. Cl. C23g 1/02
U.S. Cl. 134—41           4 Claims

ABSTRACT OF THE DISCLOSURE

A method of reclaiming tantalum from a tantalum substrate having oxides of tantalum thereon. The tantalum oxide covered substrate is contacted with molten $KHSO_4$ at a temperature in the range of 210° C. to 450° C. and in a weight ratio of at least two parts of $KHSO_4$ to one part of combined oxides. The substrate is maintained within the above temperature range for a period of time sufficient to dissolve the oxides and form a solution. The solution covered substrate is then treated with water to remove the solution therefrom to yield an essentially oxide-free tantalum substrate.

BACKGROUND OF THE INVENTION

(1) Field of the invention

This invention relates to a method of reclaiming tantalum from tantalum substrates having oxides of tantalum thereon, and more particularly, to reclaiming tantalum from tantalum substrates having oxides of tantalum thereon by selectively dissolving said oxides in molten $KHSO_4$ to yield an essentially oxide-free tantalum substrate.

(2) Description of the prior art

Within recent years, due to the advent of thin film technology, tantalum and the other so-called valve metals have attained great importance in thin film applications such as resistors and capacitors. The dielectric properties of the oxides of tantalum have found considerable use, in conjunction with the metal, as both insulators and capacitor dielectrics. In the production of such dielectrics, anodization processes are often used, such processes leading to oxide coatings containing $Ta_2O_5$ and the lower oxides of tantalum. Additionally, anodized tantalum substrates are often used as anodes, in the foil or sintered powder form, in both liquid and solid electrolyte type cathodes.

In many instances, oxide coatings are found to be deleterious in that they contain defects such as voids and impurities which often lead to decreased insulative properties. In the case of capacitors, such voids can lead to further oxidation of the metal, thereby affecting the capacitance of the capacitor and resulting in rejection of the tantalum substrate.

Additional interest in the use of tantalum is found, due to its corrosion resistance and high temperature strength, in the fabrication of corrosion resistant components, Here again oxidation may be deleterious where such oxidation interfers with the performance of the components, thereby leading to uneconomical scrapping.

Heretofore, oxidized tantalum has been purified by either removing the oxides of tantalum, or converting the oxide layer, as for example $Ta_2O_5$, to the metal. However, most of these methods require very high temperatures and either very high pressure or very high vacuum conditions. Even under these conditions, the results are not optimal. For example, the tantalum oxides can be reduced to tantalum by reaction with other metals such as calcium, aluminum or mischmetal (a mixture of rare earths) in which cerium is the main constituent [50%], at high temperatures and high reducing or inert gas pressures. The difficulties encountered are (1) appreciable amounts of the reducing metal contaminate the resultant tantalum, (2) it is difficult to remove all of the oxygen, and (3) contamination from the reaction crucible most often occurs.

Direct reduction of $Ta_2O_5$ with hydrogen even at high temperatures and pressures usually leads to the suboxides of tantalum from which point further reduction is difficult. Perhaps the most successful method of reducing the oxides of tantalum to the metal is by reaction of the oxide, e.g., $Ta_2O_5$, with carbon or carbon monoxide. The difficulty encountered in this process is that one is likely to get some carbide formation and if the tantalum is to be reclaimed for electrical applications, carbon is undesirable.

Reclamation of oxidized tantalum whereby the oxides can be selectively removed would be most desirable in those situations wherein the substrate is to be reused intact and/or for electrical purposes where carbon cannot be present. The present invention is directed to such a reclamation via the selective dissolution of the oxides of tantalum in molten $KHSO_4$ thereby resulting in an essentially oxide-free tantalum substrate in a reclaimed state.

SUMMARY OF THE INVENTION

The present invention is directed to a method for reclaiming tantalum from tantalum containing substrates bearing oxides of tantalum. Briefly, the inventive technique involves contacting the surface of the oxide coated substrate with molten $KHSO_4$ for a time period sufficient to selectively dissolve the oxides of tantalum. Thereafter, the resultant solution is removed from the substrate surface by dissolution in water, so yielding a relatively oxide-free substrate.

DESCRIPTION OF THE DRAWING

The present invention will be more readily understood by reference to the following drawing taken in conjunction with the detailed description, wherein.

DETAILED DESCRIPTION

The present invention has been described largely in terms of pure tantalum substrates. However, it will be understood that such description is for purposes of exposition and not for purposes of limitation. It will be readily appreciated that the inventive concept described is equally applicable to substrates wherein tantalum has been combined with other metals and/or inorganic materials.

Figure 1:
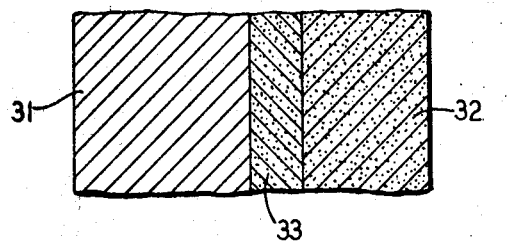
FIG. 1 is an enlarged cross sectional view of a tantalum substrate whose top surface has become oxidized and FIG. 2 is an enlarged cross sectional view of a typical solid electrolytic tantalum capacitor.

With reference now to FIG. 1, there is shown a tantalum substrate 31 having an oxide coating 32 comprising $Ta_2O_5$, formed either during exposure to the atmosphere at high temperatures or by anodization techniques. In the former case, it is often common for a thin layer 33 of tantalum suboxides, e.g., $TaO_2$, to form near the interface of the tantalum layer 31 and the $Ta_2O_5$ layer 32, such being attributed to the high rate of supply of tantalum ions near the interface. Such is also likely in the latter case, especially when there has been further gaseous oxidation resulting from defects in the $Ta_2O_5$ layer 32 or where the $Ta_2O_5$ layer 32 is too thin.

Figure 2:
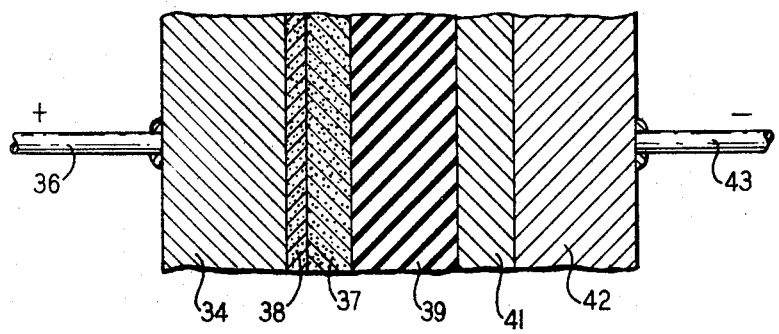

Referring to FIG. 2, there is shown a cross-sectional view of a typical solid electrolytic capacitor having a sintered powdered tantalum anode 34, to which is attached an anode lead 36, which has been anodized to form a $Ta_2O_5$ layer 37 thereupon. During the course of the anodization, due to the high tantalum ion concentration as compared to the low oxygen concentration, a suboxide layer 38 is often present. Contacting the dielectric layer 37 is an electrically conducting semiconductor layer 39, such as $MnO_2$, and in contact with layer 39 is a layer of graphite 41 which improves the electrical contact to the semiconductor layer 39 from a copper film 42, to which is attached the cathode lead 43. When the tantalum substrate has been adversely oxidized or does not meet the requisite standards in the case of capacitor anodes, $KHSO_4$ in the form of a solid is contacted with the oxide coated surface of the tantalum substrate. In the case of capacitors as, for example, the capacitor illustrated in FIG. 2, the external leads 36, 43 and the cathodic materials 42, 41 and 39 are first stripped away by suitable means. The sintered tantalum anode, having oxides 37 and 39 thereupon, is then ready to be treated with the $KHSO_4$.

The oxide coated substrate is first suspended in a suitable container containing $KHSO_4$ in solid form. A suitable container is one which can withstand temperatures up to 500° C., without reacting with the reactants it contains, i.e., the $KHSO_4$ and the tantalum substrate. Examples of such containers are those fabricated from porcelain and high alumina content ceramics. The entire surface of the oxide has to be contacted with the $KHSO_4$ and therefore the container should be of such a configuration and the quantity of $KHSO_4$ should be of such an amount as to completely cover the oxide surface area of the substrate when the $KHSO_4$ is in the molten state. The amount of $KHSO_4$ employed, of course, also depends upon the amount of oxides to be removed. It has been found that a minimum ratio of at least 2 parts of $KHSO_4$ to 1 part by weight of combined oxides is required to adequately dissolve the oxides to form a solution. A broad range has been found to be from 2-44 parts by weight of $KHSO_4$ to 1 part by weight of combined oxides for tantalum anodes having a surface area of 200 cm.²/gram and a $Ta_2O_5$ content ranging from 0.69% to 12.66% by weight. It is to be noted, that the above surface area is typical but not limiting. Larger surface areas will increase the rate of dissolution while smaller surface areas will lower said rate.

After the substrate has been placed in the porcelain container and contacted with the solid $KHSO_4$, the container is heated to a temperature of at least 210° C. in order to liquefy the $KHSO_4$. After the $KHSO_4$ attains the molten state, the substrate is maintained at a temperature within the range of 210° C. to 450° C. for a sufficient period of time to completely and selectively dissolve all the oxides, as represented by layers 32 and 33 in FIG. 1 and 37 and 38 in FIG. 2, in the molten $KHSO_4$ to form a solution. The optimum temperature range at which the substrate should be maintained has been found to be from 300° C. to 400° C. At temperatures below 300° C., the rate of selective dissolution of the oxides is too slow to be practicable whereas at temperatures above 400° C., the rate of decomposition of the $KHSO_4$ and the rate of atmospheric oxidation of the tantalum metal is too high.

The time period during which the substrate is maintained within the above temperature range is of course dependent upon several parameters such as, the temperature itself, the concentration of the combined oxides upon the tantalum substrate and the exposed surface area of the oxides. All of these parameters and their interrelationship can be experimentally determined readily by one skilled in the art. In this regard, if the substrate does not have to be reclaimed in its initial form, the substrate with the covering oxides can be pulverized into a powder which in turn can be treated with the molten $KHSO_4$.

The exposure of the oxide covered tantalum substrate to the molten $KHSO_4$ causes the tantalum oxides which are present to dissolve in the molten $KHSO_4$. This dissolution is a selective one, i.e., the rate of dissolution of the $Ta_2O_5$ and the suboxides, if present, is much greater than the rate of dissolution of metallic tantalum in molten $KHSO_4$ under the same conditions. The extent of dissolution of tantalum metal in molten $KHSO_4$ has been found to be negligible, if existent at all, under the conditions described above. Therefore, this dissolution process employing molten $KHSO_4$ can be considered a selective process for the oxides of tantalum leading to tantalum substrate recovery or reclamation.

When the tantalum oxides present have been completely dissolved (as determined from suitable experimental weight loss-time curves), the substrate is removed from the molten $KHSO_4$ bath which now contains dissolved tantalum oxides. The substrate now has absorbed and/or adsorbed solution on its surface and within its pores and in order to remove the solution, the substrate is immersed into or rinsed with water. The water may be maintained at room temperature, however, it has been found that the rate of removal of the solution from the substrate by the water improves with both agitation of the water and increased water temperature. Therefore, the solution covered substrate is immersed into a boiling water bath for a period of time sufficient to completely remove the solution from the substrate to yield an essentially oxide-free tantalum substrate. The time period required is not critical but it depends upon the amount of solution present and the rate of its dissolution in water. These factors, however, are experimentally determinable by one skilled in the art. It should be pointed out, however, that if the substrate has been maintained at a temperature above 300° C., it should be lowered below 300° C. prior to immersion into or treatment with the water. This is to prevent any undue oxidation of the tantalum and also to prevent a possible evolution of hydrogen which may lead to ignition and explosion.

The above-described sequence of oxide removal steps may, of course, be repeated any number of times depending upon the concentration of oxide which can be tolerated in the substrate.

In an alternative embodiment, it may be advantageous to initially prepare a molten bath of $KHSO_4$ and then immerse the substrate therein in a dipping process. The temperature and time parameters would be identical to those already described.

In a further alternative embodiment, solid $KHSO_4$ can be applied to the substrate in the form of a coating. Such a coating can be applied either in the dry state, such as by electrostatic techniques, or by dry dusting, or the coating can be applied by suspending the $KHSO_4$ in a suitable liquid carrier and applying the coating by spraying, painting or dipping, followed by a carrier medium evaporating step. After the $KHSO_4$ coating has been applied, the substrate is then heated to a temperature in the range of 210° C. to 450° C., preferably 300° C. to 400° C., for a sufficient period of time to (1) liquefy the $KHSO_4$ coating to form a film and (2) to allow the process of dissolution of the tantalum oxides to go to completion. The resultant solution can then be removed by treatment with hot water as described above. This embodiment is well suited for those substrates which are not very porous and which may have only a thin film of oxides.

Specific examples for the reclamation of tantalum containing substrates having oxides of tantalum thereon are as follows:

Example 1.—A porous tantalum anode fabricated by sintering tantalum powder and anodizing, obtained from a rejected capacitor, was put into a porcelain crucible at room temperature. The tantalum anode had the following parameters:

Weight of anodized anode—1.25 grams
Anodized oxide film thickness—1280 A.
Percent by weight of anodized oxide film—2.75
Surface area per gram of anode—200 cm.$^2$ The $KHSO_4$, in the solid state, was added to the crucible in the ratio of 10 parts by weight of $KHSO_4$ to one part by weight of the anodized oxides. The crucible was placed in a standard furnace which had been preheated to 350° C. The crucible was maintained at that temperature for a sufficient period of time to (1) liquefy the $KHSO_4$ and (2) to completely dissolve the anodized oxides into the molten $KHSO_4$ to form a solution. The crucible was then removed from the furnace and cooled to a temperature below 300° C., whereupon the anode was removed and inserted into a boiling water bath for one hour and then dried. The amount of weight lost after the anode was placed in the furnace for 83 minutes was ca. 2.75% which is representative of the oxides present.

Example 2.—A porous tantalum anode fabricated by sintering tantalum powder and anodizing, obtained from a rejected capacitor, was put into a porcelain crucible at room temperature. The tantalum anode had the following parameters:

Weight of anodized anode—1.25 grams
Anodized oxide film thickness—1280 A.
Percent by weight of anodized oxide film—2.75
Surface area per gram of anode—200 cm.$^2$ The $KHSO_4$, in the solid state, was added to the crucible in the ratio of 10 parts by weight of $KHSO_4$ to one part by weight of the anodized oxides. The crucible was placed in a standard furnace which had been preheated 400° C. The crucible was maintained at that temperature for sufficient period of time to (1) liquefy said $KHSO_4$ and (2) to completely dissolve the anodized oxides into said molten $KHSO_4$ to form a solution. The crucible was then removed from the furnace and cooled to a temperature below 300° C. whereupon the anode was removed and inserted into a boiling water bath for one hour and then dried. The amount of weight lost after the anode was placed in the furnace for 68 minutes was ca. 2.75% which is representative of the oxides present.

What is claimed is:

1. A method of reclaiming tantalum from a tantalum substrate having oxides of tantalum thereon, which comprises:
   (a) contacting the surface of said substrate with molten $KHSO_4$;
   (b) maintaining the substrate at a temperature of at least 210° C. for a time period sufficient to selectively dissolve said oxides to form a solution; and
   (c) removing said solution from the substrate, to yield an essentially oxide-free tantalum substrate.

2. The method as defined in claim 1 wherein said temperature is maintained in the range of 210° to 450° C.

3. The method as defined in claim 1 wherein said solution adhering to the oxide-free tantalum substrate is removed by treatment with water.

4. The method as defined in claim 1 wherein said molten $KHSO_4$ is present in the ratio of at least 2 parts by weight of $KHSO_4$ to one part by weight of the oxides.

References Cited

UNITED STATES PATENTS

| | | | |
|---|---|---|---|
| 1,326,585 | 12/1919 | Feenie | 134—41X |
| 2,927,855 | 3/1960 | Keller | 134—3X |

OTHER REFERENCES

John A. Gurklis et al., Metal Progress, 84(1), 106 (1963).

MORRIS O. WOLK, Examiner

S. MARANTZ, Assistant Examiner

U.S. Cl. X.R.

75—101, 121; 134—3; 252—79.2